US010091970B1

(12) United States Patent
Flannery et al.

(10) Patent No.: US 10,091,970 B1
(45) Date of Patent: Oct. 9, 2018

(54) PET CRATE WITH VERTICAL SLIDE CATCH APPARATUS FOR DOOR

(71) Applicant: Carlson Pet Products, Inc., Longboat Key, FL (US)

(72) Inventors: Mark A. Flannery, Longboat Key, FL (US); Caleb Summers, Saint Louis Park, MN (US); Brian M. McMahon, Minneapolis, MN (US); Brian G. Linehan, Saint Paul, MN (US)

(73) Assignee: Carlson Pet Products, Inc., Longboat Key, FL (US)

( * ) Notice: Subject to any disclaimer, the term of this patent is extended or adjusted under 35 U.S.C. 154(b) by 335 days.

(21) Appl. No.: 14/980,536

(22) Filed: Dec. 28, 2015

Related U.S. Application Data

(60) Provisional application No. 62/098,313, filed on Dec. 30, 2014.

(51) Int. Cl.
*A01K 1/03* (2006.01)
*E05B 65/00* (2006.01)

(52) U.S. Cl.
CPC .......... *A01K 1/034* (2013.01); *E05B 65/0007* (2013.01); *A01K 1/03* (2013.01); *A01K 1/031* (2013.01); *Y10S 292/29* (2013.01)

(58) Field of Classification Search
CPC ...... A01K 1/0035; A01K 1/02; A01K 1/0218; A01K 1/0236; A01K 1/0245; A01K 1/0272; A01K 1/0281; A01K 1/03; A01K 1/031; A01K 1/032; A01K 1/033; A01K 1/034; Y10S 292/59; Y10S 292/63; Y10S 292/68; Y10S 292/29; E05B 65/0007; Y10T 103/59; Y10T 103/591; Y10T 103/598

USPC ....... 292/137, 156, 161, 183, 184, 188, 143, 292/57, 59, 63, 68; 119/481
See application file for complete search history.

(56) References Cited

U.S. PATENT DOCUMENTS

| | | | | | |
|---|---|---|---|---|---|
| 58,548 | A | * | 10/1866 | Kast | E05B 65/5238 292/156 |
| 760,473 | A | * | 5/1904 | Nichols | B25B 23/0035 403/324 |
| 972,067 | A | * | 10/1910 | Dickey | E05B 65/0864 292/57 |
| 988,455 | A | * | 4/1911 | Gee | E05B 65/0007 292/189 |
| 1,193,148 | A | * | 8/1916 | Hornung | E05B 65/0864 292/210 |
| 1,355,371 | A | * | 10/1920 | Welsh | E05C 17/446 292/189 |
| 1,450,365 | A | * | 4/1923 | Gray | E05C 1/06 292/66 |
| 2,783,911 | A | * | 3/1957 | Bussing | B65D 19/10 220/7 |
| 3,087,750 | A | * | 4/1963 | Kelly | E05C 7/02 160/104 |

(Continued)

*Primary Examiner* — Tien Q Dinh
*Assistant Examiner* — Christopher D Hutchens

(57) ABSTRACT

The present wire enclosure includes a door formed of wire and a wall formed of wire. The door includes a door catch. The wall includes a wall catch. The respective catches engage and disengage each other through the employment of a vertical slide having the door catch. A finger receptor when pulled up in turn pulls up the vertical slide to disengage the catches. When in a down position, the finger receptor prevents the vertical slide from being pulled up.

13 Claims, 5 Drawing Sheets

(56) References Cited

U.S. PATENT DOCUMENTS

| | | | | |
|---|---|---|---|---|
| 3,556,058 A * | 1/1971 | Smiler | ............... | A01K 1/03 |
| | | | | 119/474 |
| 4,527,512 A * | 7/1985 | Sugiura | ............. | A01K 31/08 |
| | | | | 119/499 |
| 5,101,995 A * | 4/1992 | Trubiano | ............ | B65D 7/30 |
| | | | | 220/1.5 |
| 8,250,811 B2 * | 8/2012 | Zijlstra | ............... | E05C 1/10 |
| | | | | 292/57 |
| 2011/0180011 A1 * | 7/2011 | Chiu | ............ | A01K 1/03 |
| | | | | 119/452 |
| 2012/0227328 A1 * | 9/2012 | Link | ............. | A01K 1/0017 |
| | | | | 49/394 |
| 2016/0138322 A1 * | 5/2016 | Link | ............. | A01K 1/034 |
| | | | | 49/394 |

* cited by examiner

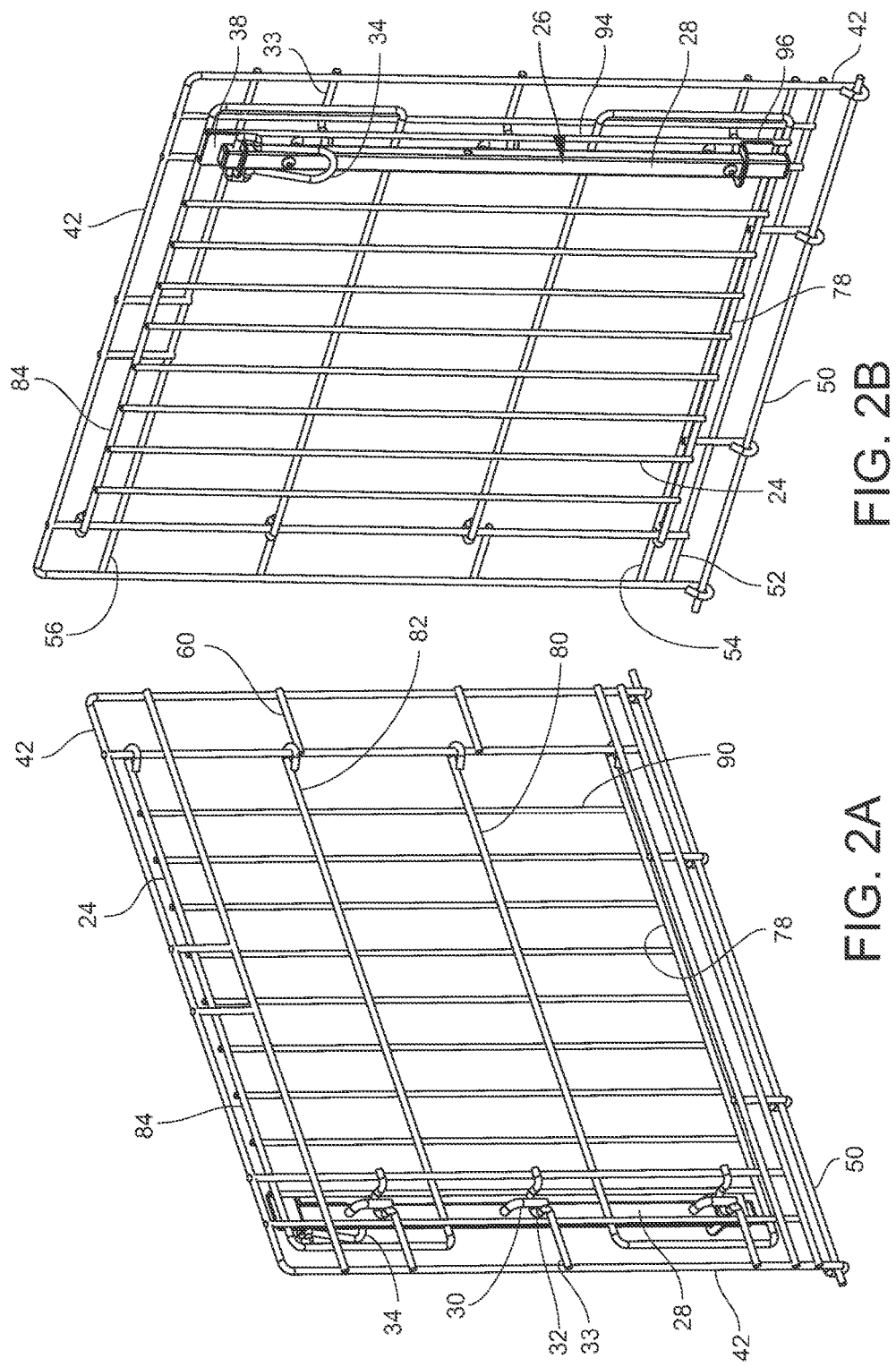

PET CRATE WITH VERTICAL SLIDE CATCH APPARATUS FOR DOOR

This application claims the benefit under 35 U.S.C. 119(e) of U.S. Provisional Patent Application No. 62/098,313 filed Dec. 30, 2014, which application is hereby incorporated by reference in its entirety into this application.

FIELD OF THE INVENTION

Background of the Invention

A pet enclosure may be a doorless conventional dog house formed out of wood and painted red. The walls may have siding and the roof may have shingles. The dog house may have a grass floor or a floor formed of wood. In the colder climates, the floor may include a thick layer of hay for insulation.

A pet enclosure may also be a pet crate that includes one or more of walls, floor, door or gate, and ceiling formed of wire. The wire permits circulation of air. The pet can look out easily at his or her environment. The pet owner can see the pet. Visibility for the pet and of the pet is maximized. Such a pet crate is usually portable.

A pet enclosure may be an exercise pen, where the pen includes a wall in the nature of a fence. Like the wire pet crate, one or more of the walls and door or gate may be formed of wire. Like the wire pet crate, air circulation and visibility for and of the pet are maximized.

SUMMARY OF THE INVENTION

A feature of the present invention is a pet crate.

Another feature of the present invention is a pet crate having six sides.

Another feature of the present invention is a pet crate having one side or one wall that includes or is formed from wire.

Another feature of the present invention is a wire enclosure having a height direction, a width direction, and a depth direction, of the wire enclosure having an inside and an outside, and of the wire enclosure having a door leading to the inside of the wire enclosure.

Another feature of the present invention is the provision in a wire enclosure, of a wall including wire, the wall being disposed generally in a plane, the wall extending in the height and width directions, and of a door including wire, the door being swingably engaged to the wall, the door being swingable to the outside of the wire enclosure, the door being disposed generally in a plane, and the door extending in the height and width directions.

Another feature of the present invention is the provision in a wire enclosure, of a slide apparatus on one of the wall and door, the slide apparatus including a vertical slide extending in the height direction, and the vertical slide having a first catch such that the first catch slides vertically with the vertical slide.

Another feature of the present invention is the provision in a wire enclosure, of a second catch on the other of the wall and door, the first catch and second catch engagable to each other to engage the wall to the door when the wall and door are generally disposed in planes adjacent to each other, the first catch and second catch when engaged preventing the door from swinging, and the first catch and second catch when engaged preventing the vertical slide from sliding downwardly.

Another feature of the present invention is the provision in a wire enclosure, of the slide apparatus including a first retainer, the first retainer engaging the vertical slide, the first retainer minimizing movement of the vertical slide in the width and depth directions, and the first retainer permitting the vertical slide to slide in the height direction.

Another feature of the present invention is the provision in a wire enclosure, of the vertical slide including a finger receptor, the finger receptor being pivotally engaged to the vertical slide such that the finger receptor has an up position and a down position, the vertical slide being pullable up by the finger receptor in the up position to disengage the first catch from the second catch, the vertical slide being drawable down by gravity to engage the first catch to the second catch, the finger receptor including a first piece extending in the width direction, the wire enclosure including a second piece that is stationary relative to the vertical slide, the first piece being pivotable to a down position below the second piece where the first piece hits the second piece when the vertical slide is slid upwardly to prevent the vertical slide from sliding upwardly and to prevent the first catch from disengaging from the second catch, and the first piece being pivotable to an up position above the second piece where the first piece is clear of the second piece when the vertical slide is slid upwardly to permit the first catch to disengage from the second catch.

Another feature of the present invention is the provision in a wire enclosure, of the slide apparatus including a finger receptor and a fixed piece that is stationary relative to the slide, the finger receptor being pivotally engaged to the slide and being pivotable between an up position and a down position, the finger receptor having a slot that receives the fixed piece when the finger receptor is in the down position, the slot of the finger receptor being pivotable away from the fixed piece to be disengaged from the fixed piece when the finger receptor is pivoted from the down position to the up position, and the slot of the finger receptor receiving the fixed piece and preventing the vertical slide from sliding upwardly when the fixed piece is in the slot and when the finger receptor is in the down position.

Another feature of the present invention is the provision in a wire enclosure, of the first retainer including a plate portion extending in the width and depth directions and having an opening, the vertical slide engaged in the opening, wherein the slide apparatus further comprises a finger receptor, the finger receptor being pivotally engaged to the slide and being pivotable between an up position and a down position, the finger receptor having a slot that receives the plate portion when the finger receptor is in the down position, the slot of the finger receptor being pivotable out away from the plate portion to be disengaged from the plate portion when the finger receptor is pivoted from the down position to the up position, and the slot of the finger receptor receiving the plate portion and preventing the vertical slide from sliding upwardly when the plate portion is in the slot and when the finger receptor is in the down position.

Another feature of the present invention is the provision in a wire enclosure, of the first retainer including a plate portion extending in the width and depth directions and having an opening, the vertical slide engaged in the opening, wherein the slide apparatus further comprises a finger receptor, the finger receptor being pivotally engaged to the slide and being pivotable between an up position and a down position, the finger receptor comprising wire that includes a U-shaped portion that receives the plate portion when the finger receptor is in the down position, the U-shaped portion of the finger receptor being pivotable out away from the plate portion to be disengaged from the plate portion when the finger receptor is pivoted from the down position to the up position, and the U-shaped portion of the finger receptor receiving the plate portion and preventing the vertical slide from sliding upwardly when the plate portion is in the U-shaped portion and when the finger receptor is in the down position.

Another feature of the present invention is the provision in a wire enclosure, of a second retainer, the first retainer being an upper retainer, the second retainer being a lower retainer and disposed below the upper retainer, each of the upper and lower retainers minimizing movement of the vertical slide in the width and depth directions, and each of the upper and lower retainers permitting the vertical slide to slide in the height direction.

Another feature of the present invention is the provision in a wire enclosure, of one of the first and second catches including a U-shaped portion, the U-shaped portion having an open end and a closed end, the open end opening to the inside of the wire enclosure, the closed end extending to the outside of the wire enclosure and extending in the depth direction, and such catch comprising wire.

Another feature of the present invention is the provision in a wire enclosure, of one of the first and second catches extending in the depth direction into the inside of the wire enclosure, the catch further extending in the height direction, and such catch comprising wire.

Another feature of the present invention is the provision in a wire enclosure, of one of the first and second catches including a U-shaped portion, the U-shaped portion having an open end and a closed end, the open end opening to the inside of the wire enclosure, the closed end extending to the outside of the wire enclosure and extending in the depth direction, and wherein the other of the first and second catches extends in the depth direction into the inside of the wire enclosure, the other of the first and second catches further extending in the height direction, and each of the first and second catches comprising wire.

Another feature of the present invention is the provision in a wire enclosure, of the vertical slide including a bar.

Another feature of the present invention is the provision in a wire enclosure, of the wall including a door opening, the door having a width greater than the door opening, and the door having a height greater than the door opening.

Another feature of the present invention is the provision in a wire enclosure, of a slide apparatus including a vertical slide on the door and extending in the height direction, the vertical slide having a door catch such that the door catch slides vertically with the vertical slide, the door catch comprising wire, of a wall catch on the wall, the wall catch including wire, the door catch and wall catch engagable to each other to engage the wall to the door when the wall and door are generally disposed in planes adjacent to each other, the door catch and wall catch when engaged preventing the door from swinging, the door catch and wall catch when engaged preventing the vertical slide from sliding downwardly, of the door catch extending in the depth direction into the inside of the wire enclosure, the door catch further extending in the height direction, and of the vertical slide further having a finger receptor on the outside of the wire enclosure, the finger receptor being pivotally engaged to the vertical slide such that the finger receptor has an up position and a down position, the vertical slide being pullable up by the finger receptor in the up position to disengage the door catch from the wall catch, the vertical slide being drawable down by gravity to engage the door catch to the wall catch, and the finger receptor when in the down position preventing the vertical slide from being pulled upwardly.

Another feature of the present invention is the provision in a wire enclosure, of the slide apparatus having an extension extending in the depth direction, the extension further extending outwardly, the extension being stationary relative to the vertical slide, and of the finger receptor having first and second portions, the first portion being pivotally engaged to the vertical slide, the second portion releasably engaging the extension and being pivotable away from the extension, and the vertical slide being slideable upwardly when the second portion is disengaged from the extension.

Another feature of the present invention is the provision in a wire enclosure, of the slide apparatus including a vertical member having upper and lower end portions, the upper end of the vertical member being slidingly anchored by an upper piece rigidly engaged to the door, the lower end of the vertical member being slidingly anchored by a lower piece rigidly engaged to the door, the upper end of the vertical member being received in an upper opening in the upper piece, and the lower end of the vertical member being received in a lower opening in the lower piece.

Another feature of the present invention is the provision in a wire enclosure, of a vertical slide having a finger receptor on the outside of the wire enclosure, and of the finger receptor being pivotally engaged to the vertical slide.

Another feature of the present invention is the provision in a wire enclosure, of a vertical slide having a finger receptor, and of the finger receptor having an up position and a down position, and of the vertical slide being pullable up by the finger receptor in the up position to disengage the door catch from the wall catch.

Another feature of the present invention is the provision in a wire enclosure, of a vertical slide being drawable down by gravity to engage a door catch to a wall catch.

Another feature of the present invention is the provision in a wire enclosure, of the finger receptor of a vertical slide when in a down position preventing the vertical slide from being slid upwardly.

Another feature of the present invention is the provision in a wire enclosure, of a vertical slide apparatus having a vertical slide with a door catch such that the door catch slides up and down with the vertical slide for engaging a wall catch and for disengaging a wall catch.

Another feature of the present invention is the provision in a wire enclosure, of a vertical slide apparatus having a door catch for catching a wall catch, of the vertical slide apparatus having a finger receptor, and of the finger receptor being engaged to the vertical slide such that the vertical slide is pulled up by a finger pulling up on the finger receptor.

An advantage of the present invention is a catch apparatus or lock apparatus or latch apparatus for a door of a wire enclosure that is easy to operate for the pet owner but that is difficult for a pet to operate.

Another advantage of the present invention is a catch apparatus or lock apparatus or latch apparatus for a door of a wire enclosure that is easy to operate from outside of the wire enclosure but that is difficult to operate from inside of the enclosure.

Another advantage of the present invention is a catch apparatus or lock apparatus or latch apparatus for a door of a wire enclosure that includes a two step process. The two step process must occur to enable the door to be opened. The two step process includes a first step of pivoting of a finger receptor and a second step of pulling up on the finger receptor to slide a slide that pulls up the door catch.

Another advantage of the present invention is a catch apparatus or lock apparatus or latch apparatus for a door of a wire enclosure that includes a lock. The lock is a finger receptor that is pivoted to and away from a locked position where the finger receptor engages an extension or fixed piece to remain locked.

Another advantage of the present invention is a catch apparatus or lock apparatus or latch apparatus for a door of a wire enclosure that includes continuity between unlocking the lock and operating the catch mechanism. This continuity is that a finger pivots a finger receptor to an unlocked position and then the same finger in the same finger receptor pulls up on the finger receptor to pull up a vertical slide to disengage the door catch from the wall catch.

Another advantage of the present invention is a catch apparatus or lock apparatus or latch apparatus for a door of a wire enclosure that returns by gravity to a catch position.

Another advantage of the present invention is a catch apparatus or lock apparatus or latch apparatus for a door of a wire enclosure that is simple and easy to open and simple and easy to close.

Another advantage of the present invention is a catch apparatus or lock apparatus or latch apparatus for a door of a wire enclosure that is inexpensive to manufacture and easy to manufacture.

Another advantage of the present invention is a catch apparatus or lock apparatus or latch apparatus for a door of a wire enclosure that is user friendly. The catch apparatus is easy to operate for a person encountering the catch mechanism for the first time. The catch apparatus, by its very architecture, signals its operation to the user.

Another advantage of the present invention is a catch apparatus or lock apparatus or latch apparatus for a door of a wire enclosure that protrudes minimally, if any, to the inside of the wire enclosure to minimize any harm or injury to the pet in the wire enclosure.

BRIEF DESCRIPTION OF THE DRAWINGS

FIG. 2A is a perspective rear view of the front wall of the pet crate of FIG. 1 and shows the door latched to the front wall.

FIG. 2B is a perspective front view of the front wall of the pet crate of FIG. 1, shows the door latched to the front wall, and shows the finger receptor of the slide in a down position that prevents the slide from being slid up.

DESCRIPTION

Figure 1:
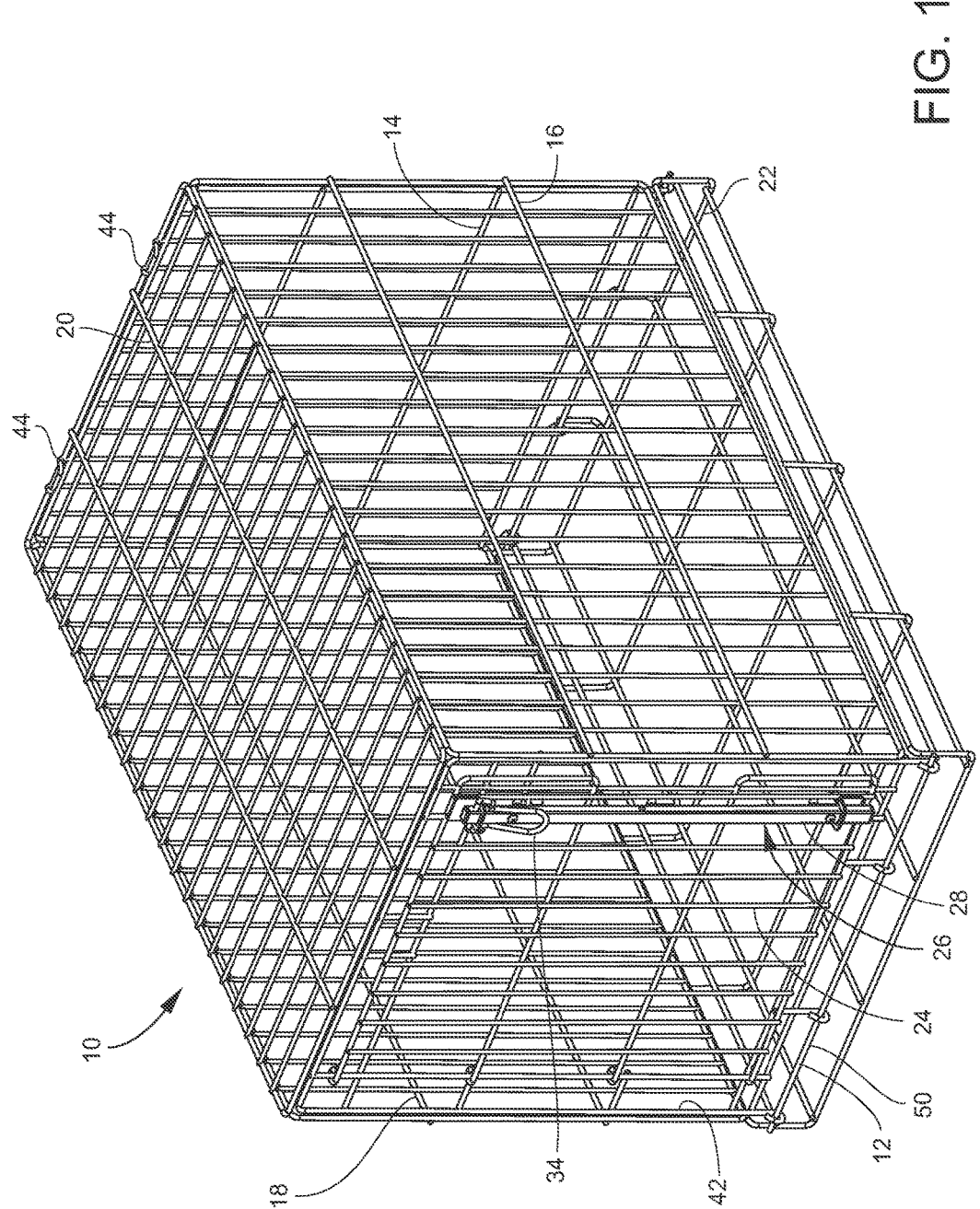
FIG. 1 is a perspective view of a wire enclosure, namely, a pet crate in the nature of a six sided structure having a door or gate to permit access to the inside of the pet crate and further having a slide apparatus or catch apparatus for latching the door.

As shown in FIG. 1, the present pet crate is indicated by the reference number 10. Pet crate 10 is a six sided structure having a front wall or section 12, a rear wall or planar section 14, a right sidewall or planar section 16, a left sidewall or planar section 18, a top or planar section 20 and a bottom section 22. Bottom section 22 is receptacle shaped or shaped in the form of a tray. A door 24 closes off an opening in the front wall 12. A slide apparatus 26 includes a slide 28 that slides vertically to disengage a set of door catches 30 from a set of wall catches 32. A finger receptor 34 formed by a wire loop is pivotally affixed to the slide 28 and is used by a user to hold between a thumb and forefinger or hook a finger therein to pivot the finger receptor 34 up to disengage the finger receptor 34 from a plate section 36 of an upper retainer 38, whereupon the finger keeps pulling up on the looped finger receptor 34 to pull up the slide 28 to pull up the door catches 30 on the slide 28 to disengage the door catches 30 from their respective wall catches 32, whereupon the door 24 may be swung open.

Figure 4:
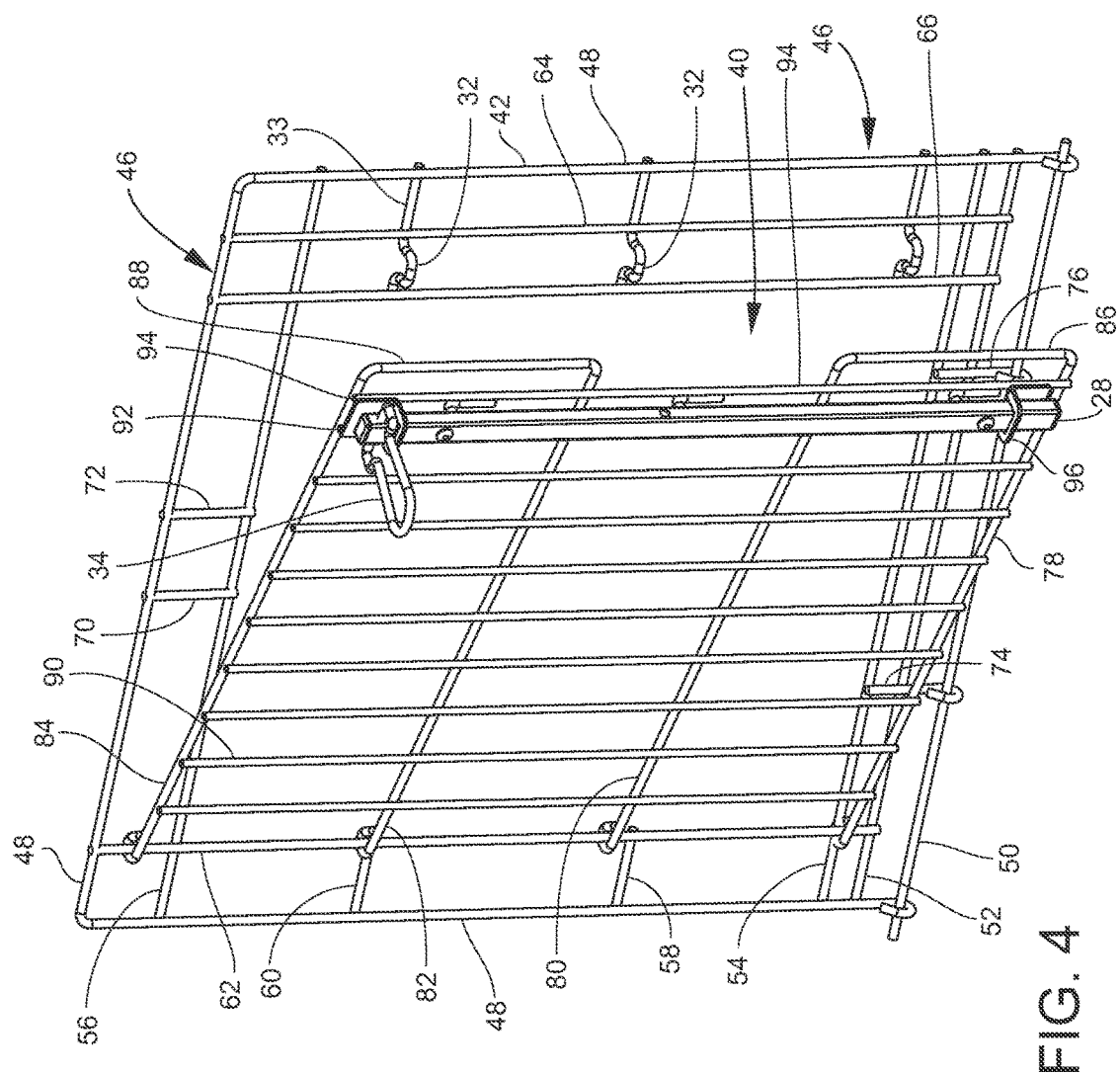
FIG. 4 is a perspective front view of the front wall of the pet crate of FIG. 1, shows the finger receptor of the slide pivoted to an up position that permits the slide to be slid up or down, shows the slide having been slid to a down position such as by gravity, and shows the door in an open position.

The door 24 may be considered to be part of the front wall 12. The front wall 12 has an opening 40, as shown in FIG. 4. Section 12 may be considered to have a base 42, where the base 42 includes the front wall 12 minus the door 24. In other words, the front wall or section 12 may be considered to include the base 42 and the door 24. The base 42 forms the opening 40. The opening 40 is closed when the door 24 is closed.

Each of the sections 12, 14, 16, 18, 20, 22, and the door 24 is formed of wire. Preferably, not including the slide apparatus 26, each of the sections 12, 14, 16, 18, 20, 22 is formed of wire where the wire forms a mesh or network, where straight wire members or where straight wire rods are set at right angles to each other and cross each other at junctions. At the junctions the straight wire members or straight wire rods are connected to each other such as by welding.

Top wall or planar section 20 includes a rectangular shaped perimeter wire. Top wall 20 further includes twenty horizontal wires extending in the width direction to and between side portions of the rectangular shaped perimeter wire, with the twenty wires being parallel to each other. Top wall 20 further includes two wires extending in the depth direction to and between end portions of the rectangular shaped perimeter wire, with the two wires being parallel to each other.

Right sidewall or planar section 16 includes a rectangular shaped perimeter wire. Right sidewall 16 further includes twenty upright wires extending in the height direction to and between upper and lower portions of the rectangular shaped perimeter wire, with the twenty wires being parallel to each other. Right sidewall 16 further includes two wires extending in the depth direction to and between end upright portions of the rectangular shaped perimeter wire, with the two wires being parallel to each other. Each of the twenty upright wires of the right sidewall 16 is aligned with one of the twenty horizontal wires of the top wall 20.

Left sidewall or planar section 18 includes a rectangular shaped perimeter wire. Left sidewall 18 further includes twenty upright wires extending in the height direction to and between upper and lower portions of the rectangular shaped perimeter wire, with the twenty wires being parallel to each other. Left sidewall 18 further includes two wires extending in the depth direction to and between end upright portions of the rectangular shaped perimeter wire, with the two wires being parallel to each other. Each of the twenty upright wires of the left sidewall 18 is aligned with one of the twenty horizontal wires of the top wall 20.

Rear wall or planar section 14 includes a rectangular shaped wire perimeter. Two outer upright wires form a portion of this periphery. These two outer upright wires extend downwardly beyond the perimeter and are swingably engaged to a horizontal wire portion of the bottom tray shaped section 22. Rear wall 14 further includes twelve upright inner wires extending in the height direction to and between upper and lower portions of the rectangular shaped wire perimeter, with the twelve wires being parallel to each other. Two of these twelve inner wires are longer than the other ten inner wires and these two longer inner wires are swingably engaged to the above mentioned horizontal wire portion of the bottom tray shaped section 22. Rear wall 14 further includes two wires extending in the width direction to and between side upright portions of the rectangular shaped perimeter wire, with the two wires being parallel to each other. Rear wall 14 is swingably attached to the pet crate 10 through the two outer upright wires and the two longer inner wires. Rear wall 14 further includes snap wire extensions 44 integrally extending from upright inner wires of the rear wall 44. Two upright inner wires form one extension 44. Each of these extensions 44 is U-shaped and is bent inwardly to snap onto and snap off a top rear horizontally extending perimeter wire of the top 20.

Bottom 22 is receptacle shaped or tray shaped. Bottom 22 includes a planar floor section formed of wire, a front section formed of wire, a rear section formed of wire, and a pair of right and left side sections formed of wire. The front section of bottom 22 is generally planar with base 42. The rear section of bottom 22 is generally planar with rear wall 14. The right side section of bottom 22 is generally parallel with right sidewall 16. The left side section of bottom 22 is generally parallel with left sidewall 18. The planar floor section includes a wire perimeter and two straight inner horizontal wires extending fully in the depth direction. These two straight inner horizontal wires at the rear of the planar floor section bend vertically to form a part of the rear section of bottom 22. The planar floor section includes three straight inner horizontal wires extending fully in the width direction. These three straight inner horizontal wires bend vertically to form a part of each of the side sections of the bottom 22. Each of the side sections, front section and rear section of the bottom 22 have a straight bottom horizontal wire and a straight top horizontal wire. Each of the side sections, front section and rear section share end upright straight wires with two adjacent said sections.

The purpose of the bottom 22 is to provide a space to, for example, slip in a solid tray or solid floor for the pet to stand on, sit on, lay on, and sleep on. Another purpose of the bottom 22 is to provide a space for storing the front wall 12 including the door 24, the rear wall 14, the right and left sidewalls 16, 18, and the top 20 when the pet crate 10 is manufactured such that these sections are swingable or foldable. These sections may make up the pet crate 10 if desired in the manner that rear wall 14 is hingedly connected to the bottom section 22 and snappingly engaged to top 20, where each of sections 12, 14, 16, and 18 are swing down and hingedly connected to top 20, and where top 20 is separated from all adjacent sections and then placed in bottom 22 for storage after the sections 12, 14, 16, 18 have been swung down into the bottom 22. If desired, top 20 can remain hingedly connected at a top side edge to one of the right or left sidewalls 16, 18 and then folded down with said right or left sidewall 16, 18 into the bottom 22.

As shown in FIG. 4, base 42 includes a wire perimeter 46 that includes an inverted U-shaped wire 48 and a bottom horizontal straight wire 50. In some embodiments of the pet crate 10, base 42 may be pivotally engaged to straight wire 50 through the pinched ends of the U-shaped wire 48. Base 42 further includes full length horizontal straight wires 52, 54, and 56 running horizontally to and between upright portions of the U-shaped wire 48. Wires 52, 54 are lower wires. Wire 56 is an upper wire. Base 42 further includes short horizontal straight wires 58, 60 that connect to and anchor an upright straight wire 60 that serves as a pivot axis for door 24.

Upright straight wire 62 runs to and between lower straight wire 52 and the horizontal portion of U-shaped wire 48. Upright straight wire 62 is further anchored by and connected to straight horizontal wires 54 and 56 such that upright straight wire 62 is anchored by and connected to wires 52, 54, 58, 60, 56 and the horizontal portion of U-shaped wire 48.

Base 42 further includes wall catches 32. Each of the wall catches 32 is integral and one-piece with a base straight horizontal wire 33 that is engaged to upright wire 64 and an upright wire portion of U-shaped wire 48. Each of the wall catches 32 is U-shaped and is engaged to and between upright wire 64 and upright wire 66. The U-shaped wall catch 32 engages door catch 30. The U-shaped portion wall catch 32 extends outwardly from the inside of the pet crate 10 to the outside of the pet crate 10 so as to minimize poking a pet in the pet crate 10 and so as to maximize space inside of the pet crate 10. The U-shaped wall catch 32 extends in the width direction and in the depth direction. The U-shaped wall catch 32 extends outwardly between vertical straight wires 64, 66. U-shaped wall catch 32 is in a horizontal plane.

Upright wires 64 and 66 extend in the height direction and are engaged to horizontal wires 52, 54 and 56. Upright wires 64, 66 are further engaged to the horizontal wire portion of U-shaped wire 48. Upright wires 64, 66 are parallel to each other and to each of the upright wire portions of the U-shaped wire 48.

Base 42 further includes short vertical inner upper wires 70, 72 that are engaged to and between horizontal wire 56 and the horizontal wire portion of U-shaped wire 48.

Base 42 further includes short vertical inner lower wires 74, 76. Wires 74, 76 are fixedly engaged to horizontal lower wires 52, 54 and may be pivotally engaged to lower horizontal straight wire 50.

Base 42 includes the opening 40. This opening 40 is formed by portions of wires 66, 56, 62 and 54. Specifically, opening 40 is formed by the portion of wire 66 between wires 54 and 56, by the portion of wire 56 between wire 66 and wire 62, by the portion of wire 62 between wires 56 and 54, and by the portion of wire 54 between wires 62 and 66.

Door 24 covers opening 40 and further covers portions of wires forming the base 42 such that base 42 and door 24 are not in a plane but are in planes adjacent to each other and generally parallel to each other. Door 24 has a height greater than a height of the opening 40. Door 24 has a width greater than the width of opening 40. Door 24 has a height less than the height of the front wall 12. Door 24 has a width (or length) less than the width (or length) of the front wall 12.

As shown in FIG. 4, door 24 includes four horizontally extending full length straight wires 78, 80, 82, 84. Wires 78, 80 are integrally joined at their distal ends by a vertical straight wire 86 and wires 82, 84 are integrally joined at their distal ends by a vertical straight wire 88. At their proximal ends, wires 78, 80, 82, 84 form eyelets that are engaged to vertical base wire 62 that serves as a swing axis for door 24. Eyelet of wire 82 is disposed immediately above and makes contact with short base wire 60 to prevent door 24 from sliding downwardly on swing axis 62. Eyelet of wire 80 is spaced from short base wire 58. The eyelet of wire 78 is disposed immediately below and makes contact with short base wire 54 to prevent door 24 from sliding upwardly on swing axis 62. Wires 78, 80, 86 form a U-shape. Wires 82, 84, 88 form a U-shape.

Door 24 includes a set of ten vertical straight full length wires 90. Each of the wires 90 is engaged to straight horizontal wires 78, 80, 82, 84. Two wires of this set of ten vertical wires are distal straight vertical wires 92, 94. Wires 92, 94 are engaged to and anchor the slide apparatus 26.

Door 24 can swing through about 180 degrees relative to a face of base 24. Rear wires 78, 80, 82, 84, 86, 88 make contact with wires of base 24 to stop a swinging of door 24 to a closed position, where such wires of base 24 include short vertical wires 70, 72, vertical wires 64, 66, and short vertical wires 74, 76. Wires 78, 80, 82, 84 hit vertical end wire 48 to stop a swinging of the door 24 to a fully open position.

As shown in FIG. 2, slide apparatus 26 includes vertical slide 28 and upper retainer 38. Slide apparatus further includes a lower retainer 96. Each of the upper retainer 38 and lower retainer 96 are L-shaped one piece plates. Lower retainer 96 takes an inverted or upside down L-shaped while upper retainer 38 is right side up. Each of the plates of the retainers 38, 96 includes a vertical plate portion and a horizontal plate portion. Each of the horizontal plate portions of the retainers 38, 96 includes an opening therein for slidingly receiving the vertical slide 26 with minimal movement in the width and depth directions. Each of the vertical plate portions of the retainers 38, 96 are engaged to the vertical straight wires 92, 94. Upper retainer 38 is adjacent to wire 84. Lower retainer 96 is adjacent to wire 78. Retainers 38, 96, slide apparatus 26 and slide 28 are on a distal portion of door 24.

Slide 28 is a tubular bar formed of a metal such as aluminum or steel or stainless steel. Slide 28 is rectangular in a horizontal section. Slide 28 falls or slides downward under the influence of gravity. Slide 28 has a front face, a rear face, and two side faces. If desired, slide 28 may be a solid bar. The height of the slide 28 is about the height, or slightly less than the height, of the door 24.

The slide apparatus 26 extends to the outside face and to the inside face of the door 24. The vertical slide 28 is on, or extends from, the outside face of the door 24. The door catches 30 are on, or extend from, the inside face of the door 24. Each of the set of three door catches 30 extends from a rear face of the slide 28. Each of the door catches 30 is wire and formed in the shape of an inverted L. Each of the door catches 30 includes a horizontally extending wire portion and a vertically extending wire portion. The vertically extending wire portion of door catch 30 catches the U-shaped wall catch 32. Door catches 30 are generally equally spaced from each other. Door catches 30 are aligned vertically with each other. Door catches 30 are disposed in a vertical plane that extends in the depth direction. One door catch 30 is disposed between horizontal wires 82 and 84. One door catch 30 is disposed between horizontal wires 82 and 80. One door catch 30 is disposed between horizontal wires 80 and 78. When door catch 30 is engaged to wall catch 32, the peak of the U-shaped wall catch 32 is disposed between the vertical portion of the door catch 30 and the rear face of the slide 28.

Figures 5A, 5B:
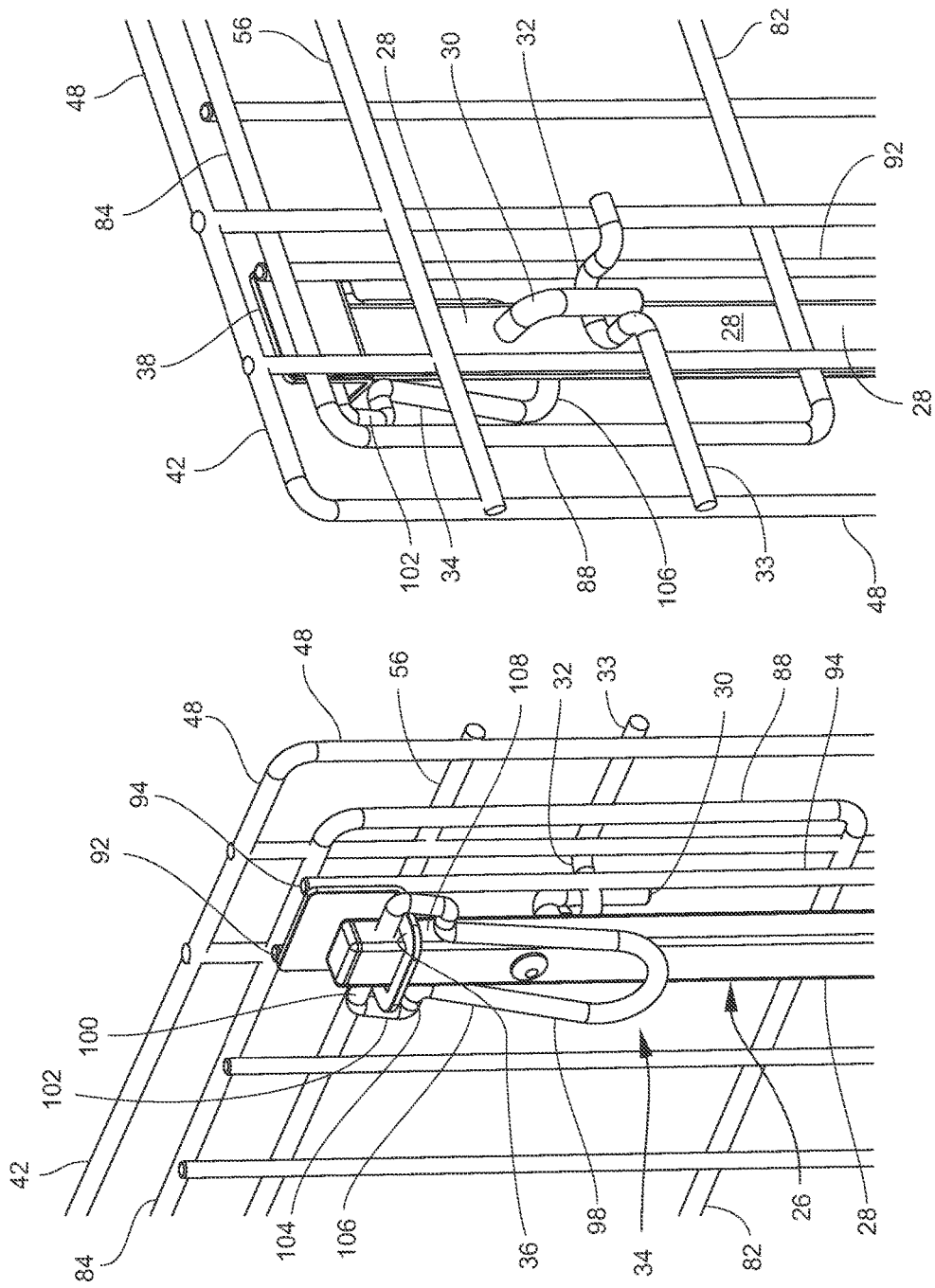
FIG. 5A is a perspective detail front view of a portion of the front wall of the pet crate of FIG. 1, shows the door latched to the front wall, and shows the finger receptor of the slide in a down position that prevents the slide from being slid up.
FIG. 5B is a perspective detail rear view of a portion of the front wall of the pet crate of FIG. 1, shows the door latched to the front wall, and shows the finger receptor of the slide in a down position that prevents the slide from being slid up.

As shown in FIG. 5A, finger receptor 34 includes a wire loop 98. Wire loop 98 can be manufactured to be endless. Wire loop 98 can be manufactured to have two ends that terminate inside of the upper end of the tubular slide 28. With either manufacture, wire loop 98 is pivotally engaged to slide 28. Finger receptor 34 is a wire loop or a finger handle or a handle or a puller or an extension.

Loop 98 includes a pair of wire ends 100 that run into the slide 28. The ends 100 run straight and horizontally out of the slide 28. From each of the ends 100, the wire loop 98 runs downwardly to form a generally vertically extending wire portion 102. From each of the wire portions 102, the wire loop 98 runs inwardly with a straight wire portion 104. Each of the straight wire portions 104 is less than the length or width of the ends 100 such that the straight wire portions 104 are spaced from the side faces of the slide 28. From the inwardly extending straight wire portions 104, the wire loop 98 forms a U-shaped wire section 106. Horizontal wire end 100, vertical wire portion 102, and horizontal wire portion 104 form a slot 108. Plate section 36 of upper retainer 38 extends into slot 108. When slide 28 is slid upwardly and wire loop 98 is in a down position, the wire portions 104 hit the plate sections 36, thereby preventing the slide 28 from being slid upwardly, thereby preventing the door catches 30 from disengaging the wall catches 32, thereby preventing the door 24 from being opened. When wire loop 98 is pivoted outwardly such that wire loop 98 is out of the down position, such that wire loop 98 is in a forwardly extending position or an upwardly extending position or an up position, then wire loop 98 and its slot 108 has been disengaged from plate section 36 so as to permit the slide 28 to be slid or pulled upwardly. It should be noted that the slot 108 and plate section 36 automatically return to an engaged position when the wire loop 98 falls or pivots downwardly from an up position to the down position. That is, if the slide 28 is already in the fully most down position, then slot 108 automatically encapsulates plate section 36 when the loop 98 falls or pivots from an up position to a down position. If slide 28 is not in the fully most down position and the wire loop 98 falls or pivots downwardly, the plate section 36 or upper retainer 38 hits the rear face of the U-shaped section 106 or the rear face of the horizontal wire portions 104, whereupon such rear faces slide downwardly on the plate section 36 or upper retainer 38 until the plate section 36 slips into the slot 108.

Figure 3B:
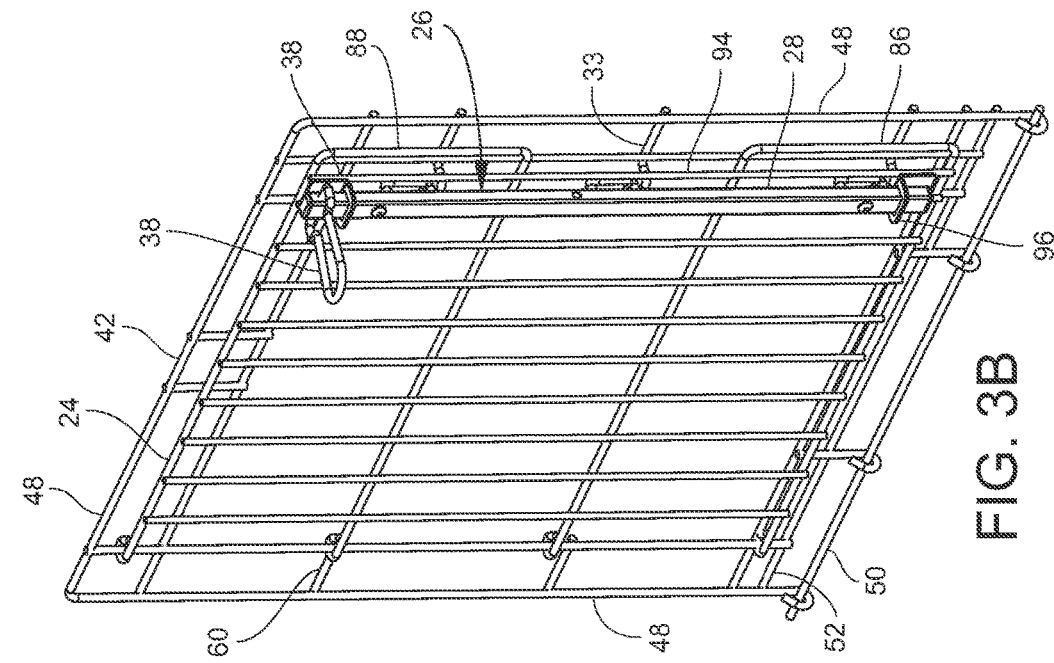
FIG. 3B is a perspective front view of the front wall of the pet crate of FIG. 1, shows the finger receptor of the slide pivoted to an up position that permits the slide to be slid up, and shows the slide in an up position where the door catch and wall catch are disengaged from each other so as to permit the door to be opened.
Figure 3A:
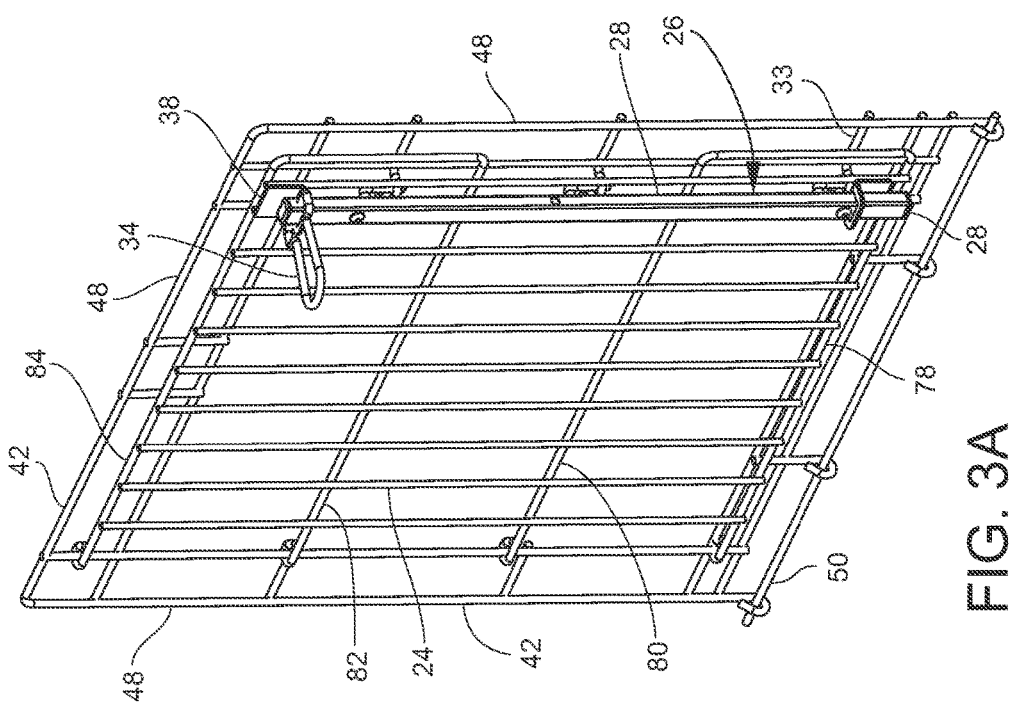
FIG. 3A is a perspective front view of the front wall of the pet crate of FIG. 1, shows the finger receptor of the slide pivoted to an up position that permits the slide to be slid up, and shows the slide in a down position where the door catch and wall catch are engaged so as to prevent the door from being opened.

In operation, the door 24 of the pet crate 10 is normally closed with no pet inside. To open the door 24, a user inserts a finger into the finger receptor 34, or pinches the finger receptor 34 between his or her thumb and forefinger. Then the user picks up the finger receptor 34 and pivots the finger receptor 34 from the down position as shown in FIGS. 2A and 2B to an up or forward position as shown in FIG. 3A. In the position shown in FIG. 3A, the finger receptor 34 is free of the plate section 36. In other words, the slot 108 of the finger receptor 34 is free of the plate section 36 and thus the slide 28 can be slid upwardly, by the user pulling or pushing upwardly on the finger receptor 34, to an open position where the door catches 30 are free of and disengaged from the wall catches 32, as shown in FIG. 3B. Then the user opens the door 24 by pulling outwardly on the finger receptor 34, whereupon the door 24 swings open. The pet can then step into the pet crate 10. Then the user, still holding onto the finger receptor 34, can push the door 24 closed with the slide 28 in the up and open position, whereupon the user can let go of the finger receptor 34, whereupon the slide 28 falls under the influence of gravity to a down position such that the door catches 30 engage the wall catches 32. As the slide 28 falls to the down and closed position, the finger receptor 34 pivots to a vertical and down position where the slot 108 of the finger receptor 34 engages the plate section 36 of the upper retainer 38. When the plate section 36 of the upper retainer 38 is in the slot 108 of the finger receptor 34, the slide 28 is prevented from being slid upwardly unless the finger receptor 34 is pivoted to a forward or up position.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A wire enclosure, the wire enclosure having a height direction, a width direction, and a depth direction, the wire enclosure having an inside and an outside, the wire enclosure comprising:
    a) a wall comprising wire, the wall being disposed generally in a plane, the wall extending in the height and width directions;
    b) a door comprising wire, the door being swingably engaged to the wall, the door being swingable to the outside of the wire enclosure, the door being disposed generally in a plane, the door extending in the height and width directions;
    c) a slide apparatus on one of the wall and door, the slide apparatus comprising a vertical slide extending in the height direction, the vertical slide having a first catch such that the first catch slides vertically with the vertical slide;
    d) a second catch on the other of the wall and door, the first catch and second catch engagable to each other to engage the wall to the door when the wall and door are generally disposed in planes adjacent to each other, the first catch and second catch when engaged preventing the door from swinging, the first catch and second catch when engaged preventing the vertical slide from sliding downwardly;
    f) the slide apparatus further comprising a first retainer, the first retainer engaging the vertical slide, the first retainer minimizing movement of the vertical slide in the width and depth directions, the first retainer permitting the vertical slide to slide in the height direction; and
    g) wherein the vertical slide comprises a finger receptor, the finger receptor being pivotally engaged to the vertical slide such that the finger receptor has an up position and a down position, the vertical slide being pullable up by the finger receptor in the up position to disengage the first catch from the second catch, the vertical slide being drawable down by gravity to engage the first catch to the second catch, the finger receptor including a wire portion extending in the width direction, the wire enclosure including a plate section that is stationary relative to the vertical slide, the wire portion being pivotable to a position below the plate section where the wire portion hits the plate section when the vertical slide is slid upwardly to prevent the vertical slide from sliding upwardly and to prevent the first catch from disengaging from the second catch, the wire portion being pivotable to a position above the plate section where the wire portion is clear of the plate section when the vertical slide is slid upwardly to permit the first catch to disengage from the second catch.

2. A wire enclosure, the wire enclosure having a height direction, a width direction, and a depth direction, the wire enclosure having an inside and an outside, the wire enclosure comprising:
    a) a wall comprising wire, the wall being disposed generally in a plane, the wall extending in the height and width directions;
    b) a door comprising wire, the door being swingably engaged to the wall, the door being swingable to the outside of the wire enclosure, the door being disposed generally in a plane, the door extending in the height and width directions;
    c) a slide apparatus on one of the wall and door, the slide apparatus comprising a vertical slide extending in the height direction, the vertical slide having a first catch such that the first catch slides vertically with the vertical slide;
    d) a second catch on the other of the wall and door, the first catch and second catch engagable to each other to engage the wall to the door when the wall and door are generally disposed in planes adjacent to each other, the first catch and second catch when engaged preventing the door from swinging, the first catch and second catch when engaged preventing the vertical slide from sliding downwardly;
    f) the slide apparatus further comprising a first retainer, the first retainer engaging the vertical slide, the first retainer minimizing movement of the vertical slide in the width and depth directions, the first retainer permitting the vertical slide to slide in the height direction; and
    g) wherein the first retainer comprises a plate portion extending in the width and depth directions and having an opening, the vertical slide engaged in the opening, wherein the slide apparatus further comprises a finger receptor, the finger receptor being pivotally engaged to the slide and being pivotable between an up position and a down position, the finger receptor having a slot that receives the plate portion when the finger receptor is in the down position, the slot of the finger receptor being pivotable out away from the plate portion to be disengaged from the plate portion when the finger receptor is pivoted from the down position to the up position, the slot of the finger receptor receiving the plate portion and preventing the vertical slide from sliding upwardly when the plate portion is in the slot and when the finger receptor is in the down position.

3. A wire enclosure, the wire enclosure having a height direction, a width direction, and a depth direction, the wire enclosure having an inside and an outside, the wire enclosure comprising:
    a) a wall comprising wire, the wall being disposed generally in a plane, the wall extending in the height and width directions;

b) a door comprising wire, the door being swingably engaged to the wall, the door being swingable to the outside of the wire enclosure, the door being disposed generally in a plane, the door extending in the height and width directions;

c) a slide apparatus on one of the wall and door, the slide apparatus comprising a vertical slide extending in the height direction, the vertical slide having a first catch such that the first catch slides vertically with the vertical slide;

d) a second catch on the other of the wall and door, the first catch and second catch engagable to each other to engage the wall to the door when the wall and door are generally disposed in planes adjacent to each other, the first catch and second catch when engaged preventing the door from swinging, the first catch and second catch when engaged preventing the vertical slide from sliding downwardly;

f) the slide apparatus further comprising a first retainer, the first retainer engaging the vertical slide, the first retainer minimizing movement of the vertical slide in the width and depth directions, the first retainer permitting the vertical slide to slide in the height direction; and g) wherein the first retainer comprises a plate portion extending in the width and depth directions and having an opening, the vertical slide engaged in the opening, wherein the slide apparatus further comprises a finger receptor, the finger receptor being pivotally engaged to the slide and being pivotable between an up position and a down position, the finger receptor comprising wire that includes a U-shaped portion that receives the plate portion when the finger receptor is in the down position, the U-shaped portion of the finger receptor being pivotable out away from the plate portion to be disengaged from the plate portion when the finger receptor is pivoted from the down position to the up position, the U-shaped portion of the finger receptor receiving the plate portion and preventing the vertical slide from sliding upwardly when the plate portion is in the U-shaped portion and when the finger receptor is in the down position.

4. The wire enclosure of claim 1, further comprising a second retainer, the first retainer being an upper retainer, the second retainer being a lower retainer and disposed below the upper retainer, each of the upper and lower retainers minimizing movement of the vertical slide in the width and depth directions, each of the upper and lower retainers permitting the vertical slide to slide in the height direction.

5. The wire enclosure of claim 1, wherein one of the first and second catches comprises a U-shaped portion, the U-shaped portion having an open end and a closed end, the open end opening to the inside of the wire enclosure, the closed end extending to the outside of the wire enclosure and extending in the depth direction, said catch comprising wire.

6. The wire enclosure of claim 1, wherein one of the first and second catches extends in the depth direction into the inside of the wire enclosure, said catch further extending in the height direction, said catch comprising wire.

7. The wire enclosure of claim 1, wherein one of the first and second catches comprises a U-shaped portion, the U-shaped portion having an open end and a closed end, the open end opening to the inside of the wire enclosure, the closed end extending to the outside of the wire enclosure and extending in the depth direction, and wherein the other of the first and second catches extends in the depth direction into the inside of the wire enclosure, said other of the first and second catches further extending in the height direction, each of the first and second catches comprising wire.

8. The wire enclosure of claim 1, wherein the vertical slide comprises a bar.

9. The wire enclosure of claim 1, wherein the wall includes a door opening, the door having a width greater than a width of the door opening, the door having a height greater than a height of the door opening.

10. The wire enclosure of claim 1, wherein the door has a width less than a width of the wall, and wherein the door has a height less than a height of the wall.

11. A wire enclosure, the wire enclosure having a height direction, a width direction, and a depth direction, the wire enclosure having an inside and an outside, the wire enclosure comprising:

a) a wall comprising wire, the wall being disposed generally in a plane, the wall extending in the height and width directions;

b) a door comprising wire, the door being swingably engaged to the wall, the door being swingable to the outside of the wire enclosure, the door being disposed generally in a plane, the door extending in the height and width directions;

c) a slide apparatus comprising a vertical slide on one of the door and wall and extending in the height direction, the vertical slide having a first catch such that the first catch slides vertically with the vertical slide, the first catch comprising wire;

d) a second catch on the other of the door and wall, the second catch comprising wire, the first catch and second catch engagable to each other to engage the wall to the door when the wall and door are generally disposed in planes adjacent to each other, the first catch and second catch when engaged preventing the door from swinging, the first catch and second catch when engaged preventing the vertical slide from sliding downwardly;

e) the first catch extending in the depth direction into the inside of the wire enclosure, the first catch further extending in the height direction;

f) the vertical slide further having a finger receptor on the outside of the wire enclosure, the finger receptor being pivotally engaged to the vertical slide such that the finger receptor has an up position and a down position, the vertical slide being pullable up by the finger receptor in the up position to disengage the first catch from the second catch, the vertical slide being drawable down by gravity to engage the first catch to the second catch, the finger receptor when in the down position preventing the vertical slide from being pulled upwardly; and g) wherein the finger receptor includes a wire portion extending in the width direction, wherein the wire enclosure includes a plate section that is stationary relative to the vertical slide, the wire portion being pivotable to a position below the plate section where the wire portion hits the plate section when the vertical slide is slid upwardly to prevent the vertical slide from sliding upwardly and to prevent the first catch from disengaging from the second catch, the wire portion being pivotable to a position above the plate section where the wire portion is clear of the plate section when the vertical slide is slid upwardly to permit the first catch to disengage from the second catch.

12. The wire enclosure of claim 11, wherein the vertical slide includes upper and lower end portions, the upper end of the vertical slide being slidingly anchored by an upper piece rigidly engaged to the door, the lower end of the vertical slide being slidingly anchored by a lower piece rigidly engaged to the door, the upper end of the vertical slide being received in an upper opening in the upper piece, and the lower end of the vertical slide being received in a lower opening in the lower piece.

13. The wire enclosure of claim 11, wherein the second catch comprises a U-shaped portion, the U-shaped portion having an open end and a closed end, the open end opening to the inside of the wire enclosure, the closed end extending to the outside of the wire enclosure and extending in the depth direction.

\* \* \* \* \*